United States Patent
Chalifoux et al.

(10) Patent No.: US 7,290,601 B2
(45) Date of Patent: Nov. 6, 2007

(54) BRAIDED THERMOCOUPLE CABLE BUNDLE

(75) Inventors: Gerald V Chalifoux, Sherwood Park (CA); Robert B Logan, Edmonton (CA)

(73) Assignee: Petrospec Engineering Ltd., Edmonton (CA)

( * ) Notice: Subject to any disclaimer, the term of this patent is extended or adjusted under 35 U.S.C. 154(b) by 0 days.

(21) Appl. No.: 11/287,719

(22) Filed: Nov. 28, 2005

(65) Prior Publication Data

US 2006/0115221 A1 Jun. 1, 2006

(30) Foreign Application Priority Data

Nov. 26, 2004 (CA) .................................. 2,487,132

(51) Int. Cl.
*E21B 47/06* (2006.01)
*G02B 6/44* (2006.01)
(52) U.S. Cl. .................. 166/66; 166/385; 166/250.07; 385/101
(58) Field of Classification Search ........... 166/250.07, 166/65.1, 66, 242.4, 250.01, 385, 77.1; 385/115, 385/101; 174/37, DIG. 14
See application file for complete search history.

(56) References Cited

U.S. PATENT DOCUMENTS

| | | | | |
|---|---|---|---|---|
| 4,336,415 A | * | 6/1982 | Walling | ........................ 174/47 |
| 4,716,962 A | * | 1/1988 | Rundell | ..................... 166/84.1 |
| 5,172,765 A | * | 12/1992 | Sas-Jaworsky et al. | ..... 166/384 |
| 5,220,130 A | * | 6/1993 | Walters | ........................ 174/36 |
| 5,604,331 A | * | 2/1997 | Matarin et al. | ......... 174/121 A |
| 6,004,639 A | * | 12/1999 | Quigley et al. | ............ 428/36.3 |
| 6,116,085 A | | 9/2000 | Moffatt et al. | |
| 6,279,392 B1 | * | 8/2001 | Shahin et al. | ............ 73/152.52 |
| 2004/0105635 A1 | * | 6/2004 | Nandi et al. | ................ 385/101 |

FOREIGN PATENT DOCUMENTS

CA 1 173 664 9/1984
CA 2 428 651 C 4/2005

OTHER PUBLICATIONS

NPH Heaters, 'Adjustable Depth (Bayonet) Thermocouples with Stainless Steel Overbraid', available at http://www.nphheaters.com/quote/thermocouples/adjustableOverbraid.htm, at least as early as Mar. 12, 2003.
NPH Heaters, No title—diagram only, available at http://www.nphheaters.com/quote/images/General_%20Leadwire.gif, at least as early as Mar. 12, 2003.
NEWPORT, 'Thermocouple Wire Overbraiding', available at http://www.newportus.com/Products/Wire/OvrBraid.htm, at least as early as Mar. 12, 2003.
ROLFES, 'Quality Temperature Calbes and Leadwire', available at http://www.rolfes.com/products/temperature_cables.htm, at least as early as Mar. 12, 2003.

* cited by examiner

*Primary Examiner*—Kenneth Thompson
(74) *Attorney, Agent, or Firm*—Christensen O'Connor Johnson Kindness PLLC

(57) ABSTRACT

A product consisting of a plurality of thermocouple cables braided or wound and covered with protective armour, thereby forming a braided bundle. The product is used in accordance with a method involving a further step of inserting the braided bundle into a well.

14 Claims, 3 Drawing Sheets

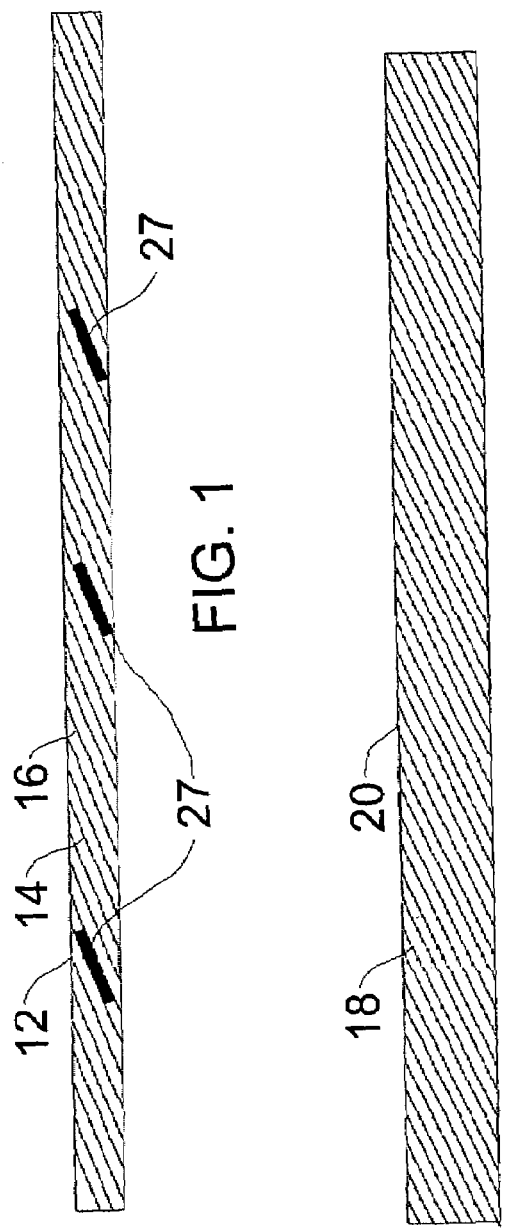
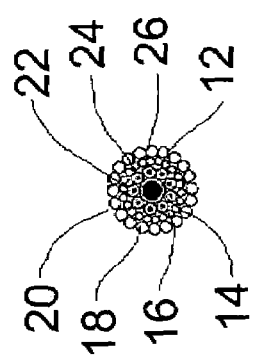
FIG. 1
FIG. 2
FIG. 3

BRAIDED THERMOCOUPLE CABLE BUNDLE

FIELD OF THE INVENTION

The present invention relates to a thermocouple cable bundle, developed to facilitate insertion of more than one thermocouple cable concurrently into a well.

BACKGROUND OF THE INVENTION

Thermocouple cables are only capable of recording temperature at between one and three points along their length. In order to monitor more than three sensing points, more than one thermocouple cable is required. It is not unusual for fifty sensing points to be required, when monitoring an oil or gas well.

SUMMARY OF THE INVENTION

According to one aspect of the present invention there is provided a product consisting of a plurality of thermocouple cables braided or wound and covered with protective armour, thereby forming a braided bundle.

According to another aspect of the present invention there is provided a method. A first step of the method involves providing the above described product in the form of a braided or wound bundle. A second step of the method involves inserting the braided or wound bundle into a well, by one of several techniques which will hereinafter be further described. The braided or wound bundle facilitates sealing and provides mechanical protection for the thermocouple cables, as they are inserted into the well.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein:

FIG. 1 is a simplified side elevation view, in section, of thermocouple cables formed into a braided bundle.

FIG. 2 is a side elevation view of the braided bundle illustrated in FIG. 1.

FIG. 3 is an end elevation view of the braided bundle illustrated in FIG. 2.

DETAILED DESCRIPTION OF THE PREFERRED EMBODIMENT

Figure 4:
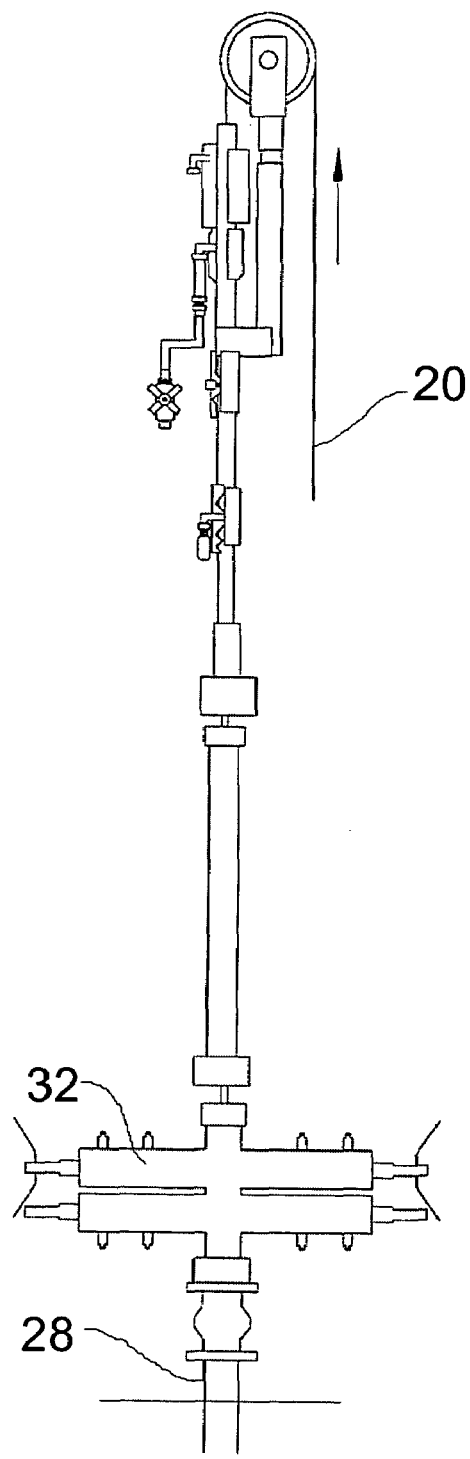
FIG. 4 is a side elevation view, in section, of a well, illustrating a "pump in" method of inserting thermocouple cables into a well as a braided bundle in accordance with the teachings of the present invention.

A preferred embodiment of thermocouple cable bundle, generally identified by reference numeral 12, will now be described with reference to FIGS. 1 through 6.

Referring now to FIG. 1, thermocouple cable bundle 12 consists of a number of thermocouple cables 14. Each thermocouple cable 14 is individually encased in an outer metal sheath 16. The thermocouple cables 14 are braided or wound to provide them with additional strength and then covered with a protective armour 18. When the term 'braided' is used, it will be understood that other means of combining, such as winding or twisting may be used instead. Referring to FIG. 2, it is preferred that thermocouple bundle 12 be covered with braided metal protective armour 18 to form a substantially round braided bundle 20. The metal may be selected from any variation of a metal compound such as carbon steel, stainless steel, galvanized steel or incoloy.

There are other secondary enhancements which may be added to thermocouple cable bundle 12. Referring to FIG. 3, a pressure monitoring capilliary tube 22 may added to braided bundle 20, thereby providing pressure monitoring capability. A conductive power wire 24 may also be added to braided bundle 20, thereby providing power transmission capability. An optical fibre 26 may be added to braided bundle 20, thereby providing optical signal transmission capability. Referring to FIG. 1, thermocouple cable bundle 12 may have sensing points 27 at intervals along its length.

Figure 6:
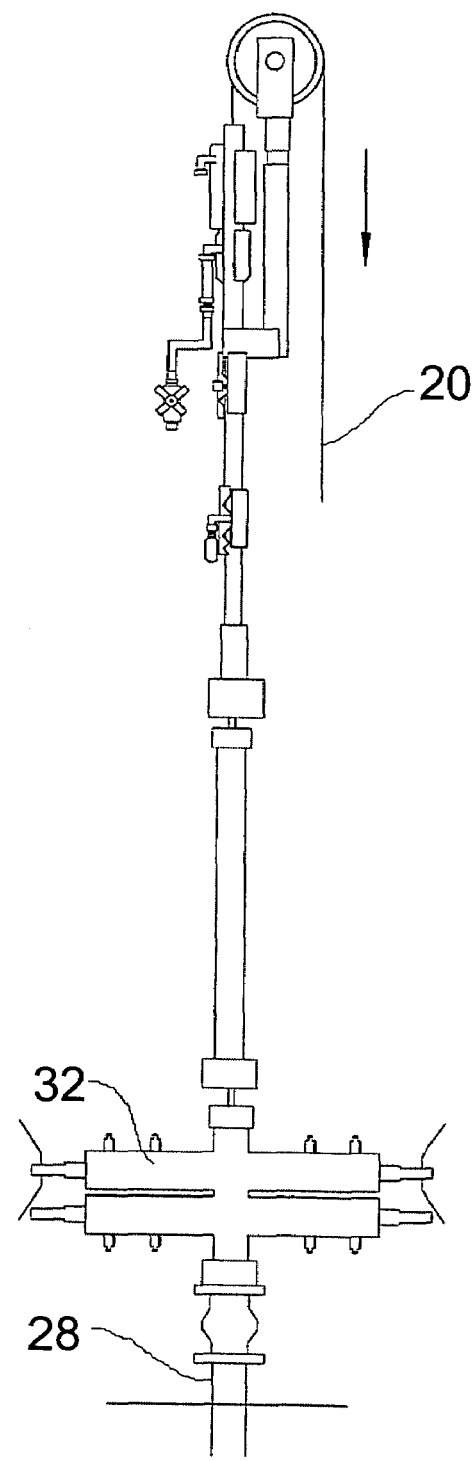
FIG. 6 is a side elevation view, in section, of a well, illustrating the method of removing the thermocouple cables from the well.
Figure 5:
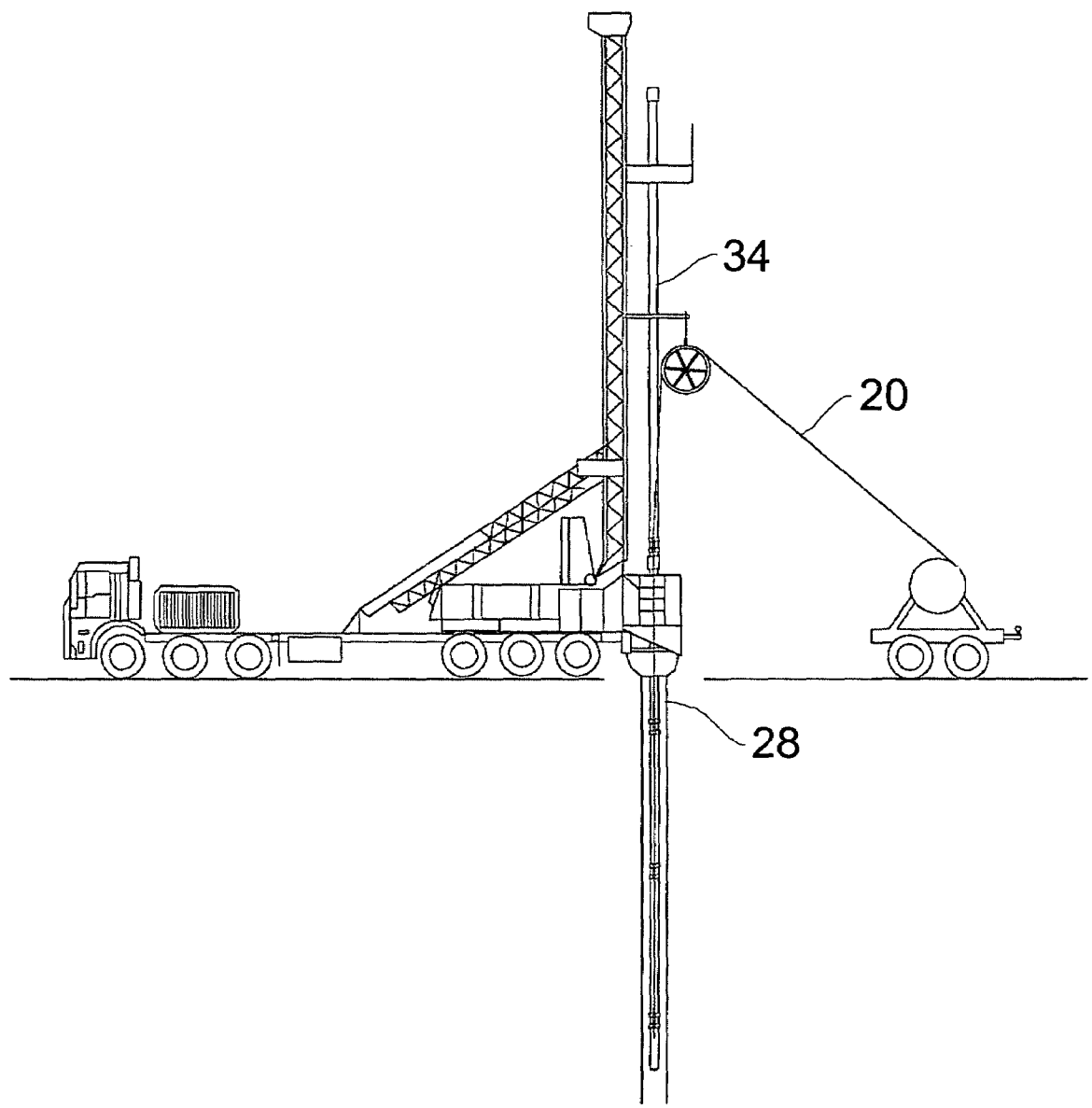
FIG. 5 is a side elevation view, in section, of a well, illustrating a "piggy back" method of inserting thermocouple cables into a well as a braided bundle in accordance with the teachings of the present invention.

Thermocouple cable bundle 12 was developed for insertion into a well, typically an oil or gas well. There are a number of ways this insertion can be accomplished. Referring to FIG. 4, one method is a "pump in" method. Braided bundle 20 is packed off and injected into an oil well 28 under pressure in accordance with established techniques used to inject wireline into an oil well. For this method a plug or "pig" (not shown) is attached to a remote end of braided bundle 20 in order to provide a surface for the carrier fluid to act against. A grease injector and lubricator 32 or a stuffing box are required to provided pressure control during "pump in" insertion into pressured or live wells. Referring to FIG. 5, another method is a "piggy back" method. This method involves affixing braided bundle 20 onto another tubular 34, which is being inserted into the well. It will be appreciated that this could involve any tubular inserted into the well, such as coil tubing, production tubing, or casing. Referring to FIG. 6, once braided bundle 20 has served its purpose, it may then be removed from well 28 by exerting an upward force to pull braided bundle 20 from well 28.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A method, comprising the steps of:
   providing multiple thermocouple cables;
   braiding or winding the thermocouple cables;
   covering the braided or wound thermocouple cables with protective armour to form a braided bundle consisting solely of the thermocouple cables; and
   inserting the braided bundle into a well using wireline techniques.

2. A method, comprising the steps of:
   providing multiple thermocouple cables;
   braiding or winding the thermocouple cables;

covering the braided or wound thermocouple cables with protective armour to form a braided bundle, the protective armour including metal wires braided or wound over the braided bundle; and inserting the braided bundle into a well.

3. The method as defined in claim 2, the metal wires being one of carbon steel, stainless steel, galvanized steel or incoloy.

4. The method as defined in claim 2, each of the thermocouple cables being encased in an individual outer protective sheath.

5. The method as defined in claim 2, a pressure monitoring capillary tube being added to the braided bundle, thereby providing pressure monitoring capability.

6. The method as defined in claim 2, a conductive power wire being added to the braided bundle, thereby providing power transmission capability.

7. The method as defined in claim 2, wherein an optical fibre is added to the braided bundle, thereby providing optical signal transmission capability.

8. The method as defined in claim 2, the braided bundle being round.

9. A method, comprising the steps of:

providing multiple thermocouple cables, each of the thermocouple cables being individually encased in an outer protective sheath;

braiding or winding the thermocouple cables;

covering the braided or wound thermocouple cables with braided or wound metal protective armour to form a substantially round braided bundle;

packing off the braided bundle;

injecting the braided bundle into a well under pressure.

10. The method as defined in claim 9, the metal being one of carbon steel, stainless steel, galvanized steel or incoloy.

11. The method as defined in claim 9, a pressure monitoring capillary tube being added to the braided bundle, thereby providing pressure monitoring capability.

12. The method as defined in claim 9, a conductive power wire being added to the braided bundle, thereby providing power transmission capability.

13. The method as defined in claim 9, a optical fiber being added to the braided bundle, thereby providing optical signal transmission capability.

14. The method as defined in claim 9, including a further step of removing the braided bundle from the well by exerting an upward force to pull the braided bundle from the well.

* * * * *